US010683101B2

(12) United States Patent
Guibert et al.

(10) Patent No.: US 10,683,101 B2
(45) Date of Patent: Jun. 16, 2020

(54) METHOD FOR DETERMINING AT LEAST ONE FAULTY PIECE OF EQUIPMENT OF AN AIRCRAFT, AND CORRESPONDING SYSTEM

(71) Applicant: SNECMA, Paris (FR)

(72) Inventors: Pierre Louis-Marie Emmanuel Guibert, Moissy-Cramayel (FR); David Guan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 40 days.

(21) Appl. No.: 14/871,434

(22) Filed: Sep. 30, 2015

(65) Prior Publication Data
US 2016/0096633 A1    Apr. 7, 2016

(30) Foreign Application Priority Data

Oct. 2, 2014  (FR) ..................... 14 59409

(51) Int. Cl.
*G01M 17/00*    (2006.01)
*G06F 7/00*     (2006.01)
(Continued)

(52) U.S. Cl.
CPC .......... *B64D 45/00* (2013.01); *G05B 23/0278* (2013.01); *G05B 23/0283* (2013.01); *B64D 2045/0085* (2013.01)

(58) Field of Classification Search
CPC ............ G05B 23/0278; G05B 23/0283; G05B 23/0248; G05B 23/0275; G05B 23/0251;
(Continued)

(56) References Cited

U.S. PATENT DOCUMENTS 4,967,337 A  * 10/1990  English .............. G05B 13/0265
                                            700/79
2003/0195675 A1* 10/2003  Felke ................. G05B 23/0278
                                            701/29.3
(Continued)

FOREIGN PATENT DOCUMENTS

EP    2 778 818 A1    9/2014
FR    2 947 080 A1    12/2010
(Continued)

OTHER PUBLICATIONS

Rapport de Recherche Préliminaire, dated Jun. 22, 2015, issued in corresponding French Application No. 1456411, filed Oct. 2, 2014, 2 pages.

*Primary Examiner* — Harry Y Oh
(74) *Attorney, Agent, or Firm* — Christensen O'Connor Johnson Kindness PLLC

(57) ABSTRACT

A method is provided for determining at least one faulty piece of equipment from amongst a plurality of pieces of equipment of an aircraft. A system is also provided that implements the method. The method comprises the steps of reading a plurality of predetermined parameters for monitoring said equipment; defining a list of symptoms associated with said parameters read, using a predetermined correspondence table; attributing a value associated with each symptom according to the parameters read, which value is selected from amongst a predetermined list of values; evaluating for each piece of equipment an occurrence of one or more fault modes for said piece of equipment on the basis of at least one predetermined truth table which associates a fault mode with each combination of symptom values; and determining at least one faulty piece of equipment from (Continued)

amongst one or more pieces of equipment, of which at least one fault mode is currently occurring, referred to as potentially faulty equipment.

12 Claims, 2 Drawing Sheets

(51) Int. Cl.
    *G06F 19/00*     (2018.01)
    *B64D 45/00*     (2006.01)
    *G05B 23/02*     (2006.01)

(58) Field of Classification Search
    CPC ............... G05B 23/0243; B64D 45/00; B64D 2045/0085; G06F 11/0736; G06F 11/0739; G06F 11/079
    See application file for complete search history.

(56) References Cited

U.S. PATENT DOCUMENTS

| | | | |
|---|---|---|---|
| 2006/0112119 A1* | 5/2006 | Vian | G07C 5/085 |
| 2010/0017167 A1 | 1/2010 | Duc | |
| 2010/0198431 A1* | 8/2010 | Corbefin | G05B 23/0272 |
| | | | 701/3 |
| 2012/0259505 A1* | 10/2012 | Turban | G05B 23/0278 |
| | | | 701/31.8 |
| 2015/0100554 A1* | 4/2015 | Wang | G06F 16/215 |
| | | | 707/692 |
| 2015/0309854 A1* | 10/2015 | Fradkin | G06F 11/008 |
| | | | 714/47.3 |

FOREIGN PATENT DOCUMENTS

| | | |
|---|---|---|
| FR | 2 973 902 A1 | 10/2012 |
| WO | 20081012486 A1 | 1/2008 |

\* cited by examiner

| A= | B= | MD= |
|---|---|---|
| ND | ND | NO |
| ND | D | NO |
| ND | NSP | NO |
| D | ND | O |
| D | D | NO |
| D | NSP | O |
| NSP | ND | NO |
| NSP | D | NO |
| NSP | NSP | NO |

METHOD FOR DETERMINING AT LEAST ONE FAULTY PIECE OF EQUIPMENT OF AN AIRCRAFT, AND CORRESPONDING SYSTEM

FIELD OF THE DISCLOSURE

The present disclosure relates generally to methods and systems for determining at least one faulty piece of equipment from amongst a plurality of pieces of equipment of an aircraft. In particular, the present disclosure relates to methods and systems for determining at least one faulty piece of equipment from amongst a plurality of pieces of equipment installed in the engine of an aircraft.

BACKGROUND

The operational availability of an aircraft and control of the maintenance costs is a major factor within the context of operating the aircraft, for example by an airline company for commercial purposes. In particular, one of the most critical systems in terms of availability and maintenance of an aircraft is its engine(s), each being composed of a multitude of pieces of equipment, which are all the more numerous the more complex the engine.

The maintenance of an engine, which is necessary in order to repair and/or prevent breakdowns, is essential for the satisfactory functioning of the aircraft, but generates substantial costs, and generally gives rise to the immobilisation of the aircraft, thus reducing its availability.

The maintenance operations of aircraft engines have developed over a period of time, changing from so-called "run to failure" maintenance (i.e. use until breakage takes place, without monitoring), to so-called "on condition" maintenance, in which for example the occurrence of failures is predicted by monitoring certain values which make it possible to indicate the start of erratic functioning of the engine (threshold value exceeded, absence of feedback from a sensor, inspection criterion met, etc.). This "on condition" maintenance makes it possible to greatly reduce the repair costs, by repairing the engine when it has failed, but before the breakage of one of its components.

However, this type of maintenance generates unscheduled maintenance operations which disrupt the use of the aircraft. Within the context of commercial use, this can give rise in particular to flights being delayed or cancelled.

Thus, it is necessary to reduce as far as possible the time necessary for this maintenance, in order to increase the availability of the aircraft. A large part of the time necessary for this maintenance is devoted to searching for and isolating at least one faulty piece of equipment to be replaced or repaired. In particular, this search and this isolation are carried out by a mechanic who is guided by a maintenance manual.

Solutions have been provided in the prior art in order to automate some of the tasks necessary for the search for and isolation of the faulty equipment. However, these solutions generally require the intervention of a mechanic, who must carry out tests and answer questions, following either a procedure or instructions obtained from the system which make the automation possible. In addition, these solutions generally incorporate knowledge bases which were set when the engine was delivered, and do not make it possible to update the knowledge bases, in particular on the basis of feedback from experience of maintenance operations carried out. Finally, these solutions are generally integrated in a computer of the aircraft, and do not make it possible to use the same tool on a plurality of different aircraft which would use the same engine.

SUMMARY

Embodiments of the present disclosure aim to eliminate at least some of the disadvantages of the known methods and systems for determining at least one faulty piece of equipment. In at least one embodiment, a determination method and a system are provided, which make it possible to automate entirely the search for and isolation of failures. In another embodiment, a determination method and a system are provided, which improve the speed of the maintenance operations, in order to increase the availability of the aeroplane being maintained. In yet another embodiment, a method and a system are provided for determining an aircraft engine which can be implemented irrespective of the aircraft in which the engine is installed. In still another embodiment, a determination method and a system are provided, which can amass the experience acquired from previous maintenance operations.

As will be described in more detail below, the present disclosure relates to a method for determining at least one faulty piece of equipment from amongst a plurality of pieces of equipment of an aircraft. In one embodiment, the method comprising the steps of:

reading a plurality of predetermined monitoring parameters of said equipment;

defining a list of symptoms associated with said monitoring parameters, using a predetermined correspondence table;

attributing a value associated with each symptom according to the parameters read, which value is selected from amongst a predetermined list of values;

evaluating for each piece of equipment an occurrence of one or more fault modes for said piece of equipment on the basis of at least one predetermined truth table which associates a fault mode with each combination of symptom values; and determining at least one faulty piece of equipment from amongst one or more pieces of equipment, of which at least one fault mode is currently occurring, referred to as potentially faulty equipment.

The method further comprises a step of creating, from the truth table, a decision tree comprising nodes, branches and leaves, said nodes defining tests on the values of the symptoms, said branches defining possible paths to complementary tests or to leaves, and said leaves defining the occurrence of the fault mode, said decision tree being designed to be searched during the step of evaluating the occurrence of a fault mode.

A method according to an aspect of the present disclosure thus makes it possible to automate the determination of at least one faulty piece of equipment by using parameters for monitoring the equipment to be monitored in order to deduce the occurrence or non-occurrence of one or more fault modes of the equipment, i.e. a faulty functioning mode which therefore potentially indicates the need to replace or repair the equipment. Since a fault mode can be associated with a plurality of potentially faulty pieces of equipment, the faulty equipment is determined from amongst a list of potentially faulty pieces of equipment, and can then be replaced or repaired during a maintenance operation by a maintenance technician.

The parameters are information obtained from the pieces of equipment, such as physical amounts (temperature, pressure, output, voltage, etc.) which make it possible to define symptoms corresponding to a particular state of a piece of equipment or part of the equipment (excess pressure of a valve, short circuit, etc.). The values which are associated with each symptom are determined according to the values of the parameters read, for example, according to the values of the physical amounts (a temperature higher than a certain value, indicating for example a symptom of overheating). The symptoms make it possible to deduce the occurrence of fault modes indicating the malfunctioning of a piece of equipment (valve jammed open, damaged circuit, etc.). The fault mode then makes it possible to determine the faulty piece(s) of equipment to be replaced or repaired.

The use of a decision tree makes it possible to greatly improve the speed of determination of the faulty equipment by means of the determination method according to the present disclosure. The tree is composed of nodes in which the values of the symptoms are verified by tests, and the branches are searched according to the values of the symptoms until the search reaches a leaf of the tree which provides the result of the occurrence or non-occurrence of the fault mode for this tree. For a faster method, a tree is created for each fault mode of each piece of equipment, such as to search small trees and optionally to be able to process different trees in parallel.

According to another embodiment of the present disclosure, the plurality of pieces of equipment is the equipment of the engine(s) of the aircraft.

In accordance with an embodiment of the present disclosure, the predetermined list of values associated with each symptom comprises the following values: a value signifying that the symptom is present and detected as such, referred to as a detected value, a value signifying that the symptom is absent and therefore not detected, referred to as a not detected value, and a value signifying that the method has no information relating to the presence or absence of the symptom, referred to as a non-detectable value.

According to one embodiment of the present disclosure, the method takes into account detected and not detected values of symptoms, but also a non-detectable symptom value, signifying for example that the data relating to the symptoms has not been received, in order to be able to distinguish firstly an absence of a failure, and secondly the impossibility of detecting any failure.

According to one embodiment of the present disclosure, the faulty piece of equipment determined during the determination step is that in which the currently occurring fault mode(s) is/are associated with all of the symptoms having the detected value.

According to one embodiment of the present disclosure, if one fault mode alone can explain all of the symptoms which have made it possible to deduce the occurrence of a fault mode, then the potentially faulty equipment associated with this fault mode is that which has the greatest probability of being faulty, and is therefore considered as the faulty equipment. This determination makes it possible to speed up the maintenance by taking into account the fact that it is generally more likely that a single piece of equipment is faulty rather than a plurality of pieces of equipment being faulty simultaneously.

If a single piece of equipment alone does not explain all the symptoms, the minimum set of fault modes of the equipment which explains all the symptoms permits determination of a set of faulty pieces of equipment.

According to an embodiment of the present disclosure, the method comprises a step of updating the truth table according to information relating to a replaced piece of equipment from amongst the plurality of potentially faulty pieces of equipment.

According to an embodiment of the present disclosure, if the replaced piece of equipment is the faulty piece of equipment, the method has been carried out with an accurate truth table which has permitted the determination of the correct faulty piece of equipment. If the replaced piece of equipment is another piece of equipment from amongst the potentially faulty pieces of equipment, and this replacement has allowed the failure to be resolved, the piece of equipment replaced was indeed faulty, and thus the truth table is updated such as to take into account this circumstance. The replacement of a different potentially faulty piece of equipment from the faulty piece of equipment is for example carried out by a maintenance technician if the replacement of the faulty piece of equipment determined has not made it possible to eliminate the symptoms detected.

According to an embodiment of the present disclosure, the decision tree is created from the truth table such as to minimize the number of nodes to be searched in the decision tree.

In one embodiment of the present disclosure, based on the truth table, certain values of symptoms can make it possible to reduce substantially the number of nodes or steps to be searched. For example if the non-detection of a symptom gives rise directly to the non-occurrence of the fault mode, the first symptom value considered in the decision tree can be this value in order to reduce the number of nodes of the decision tree. This minimization can advantageously be applied by using a mathematical criterion.

In one embodiment of the present disclosure, the number of nodes to be searched in the decision tree is minimized by minimization of the Gini coefficient.

According to an embodiment of the present disclosure, the step of determining the faulty piece of equipment comprises a step of classifying the potentially faulty equipment according to a failure rate of each piece of equipment.

In one embodiment, the classification of the potentially faulty equipment makes it possible to indicate to a maintenance technician responsible for replacing the equipment the order in which he must replace the potentially faulty equipment so as to increase the probability that the piece of equipment replaced is actually the faulty piece of equipment, owing to a higher failure rate than the other equipment. If the replacement of the first piece of equipment of the classification does not solve the problem encountered, the technician replaces the second piece of equipment, then the third if necessary, etc.

The present disclosure also relates to a system for determining at least one faulty piece of equipment from amongst a plurality of pieces of equipment of an aircraft, comprising:
  means for reading a plurality of predetermined parameters for monitoring said equipment;
  means for defining a list of symptoms associated with said parameters read, using a predetermined correspondence table;
  means for attributing a value associated with each symptom according to the parameters read, which value is selected from amongst a predetermined list of values;
  means for evaluating for each piece of equipment an occurrence of one or more fault modes for said piece of equipment on the basis of at least one predetermined truth table which associates a fault mode with each combination of symptom values; and
  means for determining at least one faulty piece of equipment from amongst one or more pieces of equipment, of which at least one fault mode is currently occurring, referred to as potentially faulty equipment.

The evaluation means in one embodiment can be designed to create from the truth table a decision tree comprising nodes, branches and leaves, said nodes defining tests relating to the values of the symptoms, said branches defining possible paths to complementary tests or to leaves, and said leaves defining the occurrence of the fault mode, and being designed to evaluate the occurrence of a fault mode from said decision tree.

According to an embodiment of the present disclosure, the system is designed to be integrated in a computer of an aircraft.

In one embodiment, all of the system is integrated in the aircraft such as to permit for example the determination of faulty equipment mid-flight and to transmit the information relating to the faulty equipment to the pilot of the aircraft.

In one embodiment, the reading, definition and attribution means are designed to be integrated in a computer of an aircraft, and the evaluation means and the determination means are designed to be integrated in a maintenance tool outside the aircraft.

In one embodiment, only the attribution of the values of the symptoms on the basis of the parameters read is carried out on the aircraft, the evaluation means and the determination means being external, for example in a maintenance computer which is connected to the aircraft when it is on the ground. Thus, the maintenance computer can for example be used for a plurality of different aircraft.

One or more embodiments of the disclosed determination method are implemented by one or more embodiments of the disclosed determination system. As such, one or more embodiments of the disclosed determination system implements one or more embodiments of the disclosed determination methods.

The reading, definition, attribution, evaluation and determination means of one or more embodiments of the determination system respectively implement the reading, definition, attribution, evaluation and determination steps of the determination method.

The present disclosure also relates to a method and to a system characterized in combination by some or all of the features described previously or hereinafter.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The following embodiments are examples. Although the description refers to one or more embodiments, this does not necessarily mean that each reference concerns the same embodiment, or that the features apply only to a single embodiment. Single features of different embodiments can also be combined in order to provide other embodiments.

Figure 1:
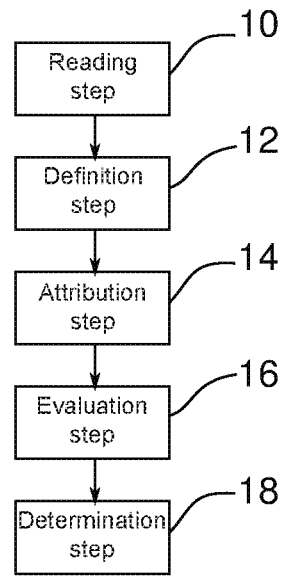
FIG. 1 is a schematic representation of a determination method according to an embodiment of the present disclosure.

FIG. 1 schematically shows a determination method according to an embodiment of the present disclosure. The method is suitable for determining at least one faulty piece of equipment from amongst a plurality of pieces of equipment of an aircraft. The method can be used for any type of equipment of the aircraft, in particular for equipment which forms the engine of the aircraft, the maintenance of which is an important element for the safety and availability of the aircraft.

The first step of the determination method is a step 10 of reading predetermined parameters for monitoring the equipment. These parameters are read for example by means of sensors, and are for example parameters relating to a pressure, a flow, an electric voltage, a temperature, etc.

In a second step of the determination method, referred to as the definition step 12, a list of symptoms is defined using a predetermined correspondence table, the symptoms being associated with the parameters read during the reading step 10. For example, a parameter read is the pressure P of a fluid in a valve V, the pressure P being detected by a pressure sensor. The read value of the pressure P is for example associated with a symptom A of excess pressure in the valve V, according to the correspondence table. Another symptom B of short-circuiting of a controller of the valve V depends on a voltage parameter U measured at the terminals of the controller.

The correspondence table can be constituted by a table in memory, but also for example by simple combination of logic gates or another device making it possible to pass, by means of correspondence, from a parameter of the piece of equipment to the definition of a symptom.

The third step of the determination method is a step 14 of attributing a value associated with each symptom according to the parameters read. In this embodiment of the present disclosure, the symptoms can assume three values, i.e. detected (signifying that the symptom is present and detected as such, denoted in FIGS. 3 and 4 by the letter D), not detected (signifying that the symptom is not present and therefore not detected, denoted in FIGS. 3 and 4 by the letters ND), and non-detectable (signifying that the symptom is present or is not present and that it is not possible to know which, denoted in FIGS. 3 and 4 by the letters NSP). The values "detected" and "not detected" correspond to the value of the symptom being attributed according to the parameters if all the parameters necessary for the attribution of the value have been read. If all the parameters necessary cannot be read, in an anticipated manner (parameter not available at the moment of reading, for example because one or more parameters are only detectable at a certain altitude, on the ground, or in a certain functioning mode, etc.) or in an unforeseen manner (faulty sensor), the value "non-detectable" is attributed to the symptom. This "non-detectable" value makes it possible to not consider a lack of a parameter as signifying an absence or presence of the symptom, but to consider it nevertheless in the rest of the method.

The fourth step of the determination method is a step 16 of evaluating an occurrence of one or more fault modes for each piece of equipment. A fault mode is a type of fault which can explain one or more symptoms and is either currently occurring or not currently occurring. The fault modes are evaluated by combining the values of the different symptoms on the basis of a truth table by fault mode. For example, a fault mode of the valve V is the fact that the valve V is jammed open. This fault mode is associated with the values of the two symptoms A and B, as explained hereinafter in the description with reference to FIG. 3.

The fifth step of the determination method is a step 18 of determining the faulty piece of equipment from amongst one or more pieces of equipment referred to as potentially faulty equipment. This potentially faulty equipment is the equipment for which at least one fault mode is currently occurring, i.e. that this equipment would be able to explain a failure, and therefore replacing it could eliminate this failure.

The determination of the faulty equipment is carried out according to the result obtained in the preceding steps, in particular by analysis of the currently occurring fault modes relative to the symptoms encountered. In fact, if one fault mode alone makes it possible to explain all of the symptoms detected, and a set of fault modes could also explain the detection of these same symptoms, then it is considered that it is the fault mode alone which is the cause. This is justified by the fact that the possibility of having a single currently occurring fault mode is greater than the probability of having a plurality of currently occurring fault modes. In this case, the equipment for which this fault mode alone is currently occurring is the faulty equipment.

It is however possible that a plurality of pieces of equipment can each explain all the symptoms detected. Thus, the method can classify the potentially faulty equipment according to the failure rate of the equipment, since a higher failure rate generates greater probability that the potentially faulty equipment is indeed faulty. These potentially faulty pieces of equipment are presented to a maintenance technician in the order of this classification, and the technician replaces the first piece of equipment on the list, then the second if the problem is still present, etc.

If a single piece of equipment alone does not explain all the symptoms, the minimum set of fault modes of the pieces of equipment which explain all of the symptoms permits determination of a set of faulty pieces of equipment, which is presented to the maintenance technician who must replace them all.

Once the problem has been eliminated, the technician is asked to indicate via a man-machine interface (MMI) the equipment which has been replaced, and which therefore solves the problem. This indication via the MMI makes it possible to update the truth table or the failure rate:
  if the piece of equipment replaced is the piece of equipment determined as faulty, the method has been applied satisfactorily and the truth table is not modified;
  if the piece of equipment replaced is a piece of equipment which forms part of the classification of the potentially faulty equipment, but is not the first on the list, the failure rate is increased;
  if the piece of equipment replaced does not form part of the faulty equipment, the truth table is updated to include the fault mode(s) relating to the piece of equipment replaced, the values of the symptoms in the truth table being those which have been detected.

The determination method according to the present disclosure can be implemented by a determination system 20.

Figure 2:
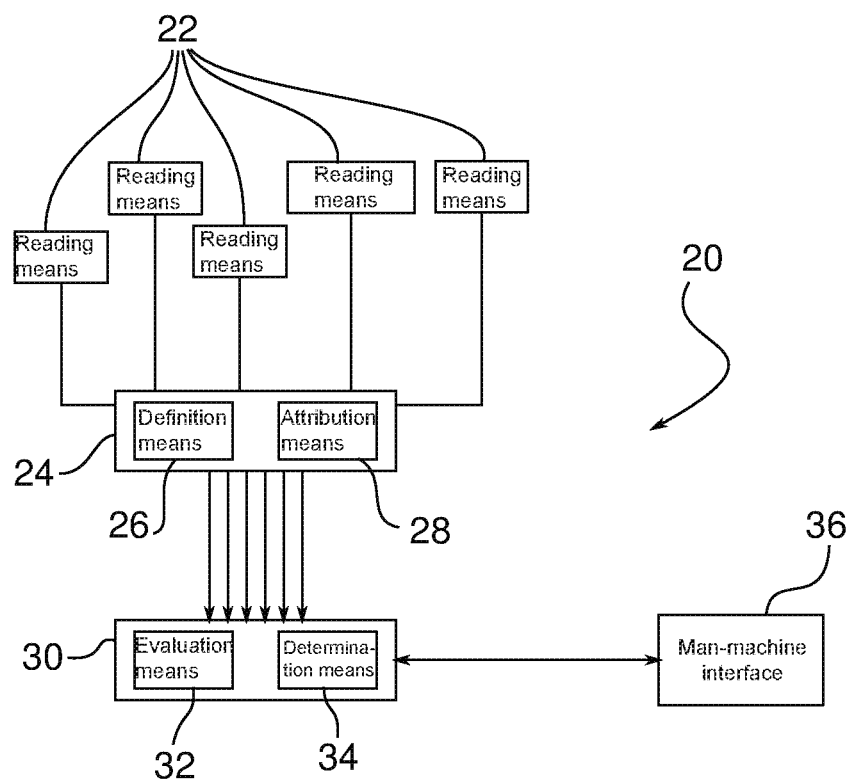
FIG. 2 is a schematic representation of a determination system according to an embodiment of the present disclosure.

An embodiment of this determination system 20 is represented with reference to FIG. 2. The determination system 20 retrieves the monitoring parameters by means of a multitude of reading means 22. These reading means 22 are for example sensors measuring parameters of all types such as a voltage, an output, a pressure, a temperature, etc.

The reading means 22 transmit the parameters read to a processing device 24, comprising means 26 for defining a list of symptoms associated with the parameters read, and means 28 for attributing a value associated with each symptom. The definition means 26 make it possible to define which parameters must be read in order to detect the symptoms, for example a piece of equipment can be faulty if the symptom is that the valve V has excess pressure, and the detection of excess pressure of the valve V requires reading of a certain pressure sensor associated with this valve. The attribution means 28 make it possible to allocate to each symptom a value according to the parameters read, for example if the pressure sensor measures a pressure higher than a predefined level. The definition means 26 and the attribution means 28 of the processing device 24 can be separate or combined in a computer or a logic circuit.

The symptoms and their values are transmitted to an analysis device 30, comprising means 32 for evaluating the occurrence of the fault modes for each piece of equipment, and means 34 for determining the faulty equipment from amongst the potentially faulty equipment. These evaluation means 32 and these determination means 34 execute algorithms based on truth tables and/or decision trees, the mechanism of which is described hereinafter with reference to FIGS. 3 and 4. The algorithms are executed for example on a calculator, a computer, etc.

Information intended for the maintenance technician or information provided by the maintenance technician can be transmitted by means of the man-machine interface (MMI) 36.

Depending on the embodiments, the various means which form the system 20 can be combined in a single location, for example in a computer, or they can be distributed in a plurality of locations:
  according to a first embodiment, all of the means which form the system 20 are located in a computer of the aircraft, preferably a computer of the engine(s) of the aircraft if the pieces of equipment are equipment of the engine(s) of the aircraft. Thus, the technician can ascertain directly which equipment is faulty by connecting to a maintenance tool via an interface with the system 20, for example the man-machine interface 36. The faulty piece of equipment can also be communicated to the pilot(s) of the aircraft. According to requirements, the determination method implemented by the determination system 20 can be implemented during the flight of the aircraft or at the request of the maintenance technician on the ground. The results determined during the flight can also be saved during the flight in order to be consulted on the ground;
  according to a second embodiment, only the reading means 22, the definition means 26 and the attribution means 28 are located on the aircraft or on the engine(s) of the aircraft. The evaluation means 32 and the determination means 34 are located in a maintenance tool, for example a maintenance computer, which thus retrieves the symptoms and their values in order to determine which piece of equipment is faulty. This makes it possible for example to use the same computer for a plurality of engines installed on a plurality of different aircraft, irrespective of the type of aircraft. In addition, the maintenance computer can be updated according to the maintenance of a plurality of engines and can therefore build up the experience of previous maintenance operations. The updating can also be carried out by a central maintenance server, which makes it possible to build up the experience of all the maintenance computers connected to this server, and therefore greatly improve the maintenance performance.

Figures 3, 4:
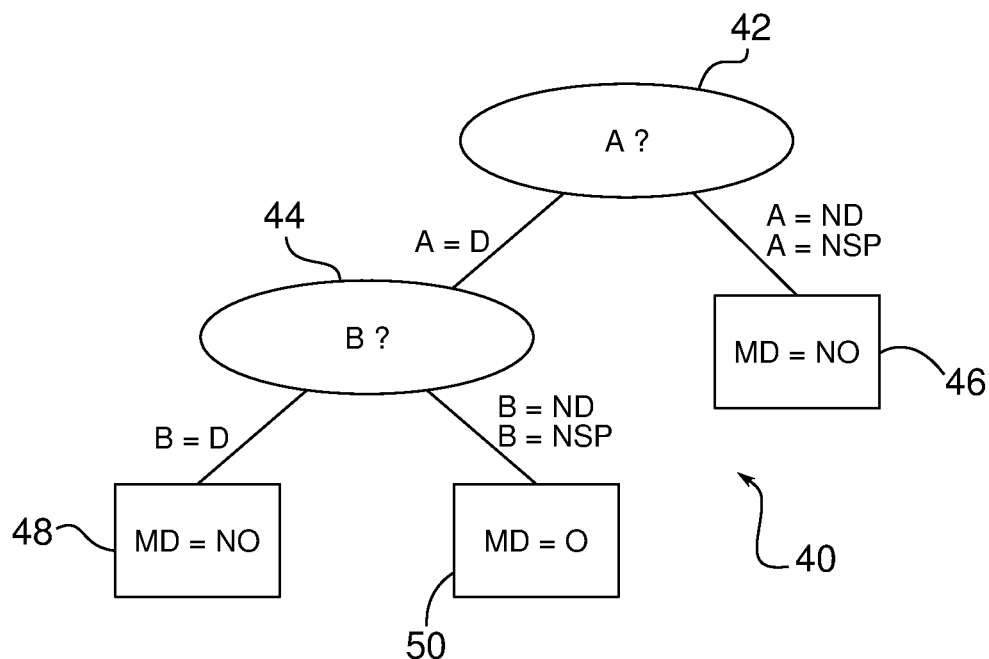
FIG. 3 is a truth table according to an embodiment of the present disclosure.
FIG. 4 is a decision tree according to an embodiment of the present disclosure.

FIG. 3 represents a truth table 38 according to an embodiment of the present disclosure, used during the step 16 of evaluating the occurrence of the fault modes for each piece of equipment, and by the means for evaluating the fault modes for each piece of equipment. The first two columns represent symptoms, in this case the symptom A in the first column and the symptom B in the second column. The lines represent the various combinations of values of the symptoms A and B, which will make it possible to determine the occurrence of a fault mode MD, represented by the final column.

In this case, the symptoms A and B can assume three values, i.e. detected (D), not detected (ND), and non-detectable (NSP). Combining these three values with one another for the two symptoms therefore provides nine possibilities of combinations, represented by the nine lines in table 38. The result of the combinations gives the occurrence of the fault mode MD, which is either currently occurring (denoted by the letter O), or not currently occurring (denoted by the letters NO).

In this example, the symptom A is an excess pressure of the valve V, and the symptom B is a short circuit of the controller of the valve V. The fault mode MD is the fact that the valve V is jammed open. Reading the truth table 38 shows that the fault mode MD is currently occurring (O) when the symptom A is detected (D) and when the symptom B is not detected (ND) or non-detectable (NSP).

In order to improve the speed of determination of the faulty piece of equipment, it is possible to improve the speed of the step 16 of evaluating the occurrence of the fault modes by the addition of a step of creating a decision tree 40 on the basis of the truth table 38.

The decision tree 40 is formed of a root 42, representing the first symptom, the value of which is verified by means of a test of the value of the symptom, in order to obtain the occurrence of the fault mode. The root 42 is a start node of the decision tree 40. In the decision tree in FIG. 4, the value of the symptom A is verified by a test on the value A, represented by "A?". The value of the symptom defines the branch taken on the path of the decision tree 40, i.e. a route which is taken. If the symptom A is detected (A=D), the path of the tree 40 goes to the node 44, and if the symptom A is not detected (A=ND) or non-detectable (A=NSP), the path of the tree 40 goes to a leaf 46, i.e. to one of the ends of the path of the tree 40. Similarly, the value of the symptom B is verified on the node 44 by a test on the value B, represented by "B?". If the symptom B is detected (B=D), the path of the tree 40 goes to a leaf 48, and if the symptom B is not detected (B=ND) or non-detectable (B=NSP), the path of the tree 40 goes to a leaf 50.

The leaves 46, 48 and 50 give the occurrence of the fault mode MD. In this case the end of the path at the leaves 46 and 48 indicates that the fault mode MD is not currently occurring (NO), and the leaf 50 indicates that the fault mode MD is currently occurring (O).

The decision tree 40 is created such as to minimize the number of nodes which it comprises. For example, since the decision tree 40 in FIG. 4 is created from the truth table 38 in FIG. 3, it is found in this truth table 38 that only two combinations of values of the symptoms A and B give the currently occurring fault mode MD, i.e. the combination A=D and B=ND and the combination A=D and B=NSP. Thus, verifying firstly the value of the symptom A makes it possible to determine rapidly the occurrence of the fault mode MD, the values A=ND and A=NSP indicating directly that the fault mode is not currently occurring (NO), without needing to verify the value of the symptom B.

In order to automate the creation of the decision trees 40 and minimization thereof, it is possible to use a mathematical criterion such as, for example, Shannon's entropy, Gini's coefficient (also referred to as Gini's index), and their variants.

The use of a decision tree 40 based on the table 38 therefore permits improvement of the speed of execution of the method by reducing the number of verifications of the values of the symptoms and by using only one decision tree 40 per fault mode, i.e. n fault trees per piece of equipment for n fault modes, rather than a single large tree per piece of equipment. The smaller trees for each fault mode are simpler to optimise, and can be executed in parallel if necessary.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method performed by a computer for determining at least one faulty piece of equipment from amongst a plurality of pieces of equipment of an aircraft, comprising the steps of:
reading a plurality of predetermined parameters for monitoring said equipment;
defining a list of symptoms associated with said monitoring parameters, using a predetermined correspondence table;
attributing a symptom value associated with each symptom according to the parameters read, the symptom value being selected from amongst a predetermined list of symptom values, said predetermined list of symptom values comprising the following: a detected value signifying that the symptom is present and detected as such; a not detected value signifying that the symptom is absent and therefore not detected; and a non-detectable value signifying that the method has no information relating to the presence or absence of the symptom;
evaluating for each piece of equipment an occurrence of one or more fault modes for said equipment when the one or more fault modes occur on the basis of at least one predetermined truth table comprising combinations of symptom values and which associates a fault mode with each combination of symptom values;
determining at least one faulty piece of equipment from amongst one or more pieces of potentially faulty equipment when a fault is detected, each of the one or more pieces of potentially faulty equipment having at least one fault mode that is currently occurring; and creating, from the truth table, a decision tree comprising nodes, branches and leaves, said nodes defining tests on the symptom values, said branches defining possible paths to complementary tests or to leaves, and said leaves defining the occurrence of the fault mode, said decision tree being designed to be searched during the step of evaluating the occurrence of a fault mode, wherein the decision tree is created from the truth table so as to minimize the number of nodes to be searched in the decision tree.

2. The method according to claim 1, wherein the at least one fault mode that is currently occurring with the at least one faulty piece of equipment determined during the determination step is associated with all of the symptoms having the detected value.

3. The method according to claim 1, comprising a step of updating the truth table according to information relating to a replaced piece of equipment.

4. The method according to claim 1, wherein the number of nodes to be searched in the decision tree is minimized by minimization of the Gini coefficient.

5. The method according to claim 1, wherein the step of determining the at least one faulty piece of equipment comprises a step of classifying the one or more potentially faulty equipment according to a failure rate of each piece of equipment.

6. A system for determining at least one faulty piece of equipment from amongst a plurality of pieces of equipment of an aircraft, comprising:
   means for reading a plurality of predetermined parameters for monitoring said equipment;
   means for defining a list of symptoms associated with said parameters read, using a predetermined correspondence table;
   means for attributing a symptom value associated with each symptom according to the parameters read, the symptom value being selected from amongst a predetermined list of symptom values, said predetermined list of symptom values comprising the following: a detected value signifying that the symptom is present and detected as such; a not detected value signifying that the symptom is absent and therefore not detected; and a non-detectable value signifying that the method has no information relating to the presence or absence of the symptom;
   means for evaluating for each piece of equipment an occurrence of one or more fault modes for said piece of equipment when the one or more fault modes occur on the basis of at least one predetermined truth table comprising combinations of symptom values and which associates a fault mode with each combination of symptom values; and
   means for determining at least one faulty piece of equipment from amongst one or more potentially faulty pieces of equipment when a fault is detected, each of the one or more pieces of potentially faulty equipment having at least one fault mode that is currently occurring,
   wherein the evaluation means being designed to create, from the truth table, a decision tree comprising nodes, branches and leaves, said nodes defining tests relating to the symptom values, said branches defining possible paths to complementary tests or to leaves, and said leaves defining the occurrence of the fault mode and being designed to evaluate the occurrence of a fault mode from said decision tree, wherein the decision tree is created from the truth table so as to minimize the number of nodes to be searched in the decision tree.

7. The system according to claim 6, wherein the system is designed to be integrated in a computer of an aircraft.

8. The system according to claim 6, wherein the reading means, the definition means and the attribution means are designed to be integrated in a computer of an aircraft, and wherein the evaluation means and the determination means are designed to be integrated in a maintenance tool outside the aircraft.

9. The system according to claim 6, wherein mathematical criterion is used for creation of the decision tree from the truth table in order to minimize the number of nodes to be searched in the decision tree.

10. The system according to claim 9, wherein the mathematical criterion is selected from the group consisting of Shannon's entropy and Gini's coefficient.

11. The method according to claim 1, wherein said step of creating, from the truth table, a decision tree comprising nodes, branches and leaves, uses mathematical criterion in order to minimize the number of nodes to be searched in the decision tree.

12. The method according to claim 11, wherein the mathematical criterion is selected from the group consisting of Shannon's entropy and Gini's coefficient.

* * * * *